United States Patent [19]
Simmons

[11] Patent Number: 5,481,452
[45] Date of Patent: Jan. 2, 1996

[54] PROGRAMMABLE SWITCHING UNIT

[76] Inventor: Robert G. R. Simmons, Apt. 205, 350 The West Mall, Etobicoke, Ontario, Canada, M9C 1E6

[21] Appl. No.: 919,241

[22] Filed: Jul. 27, 1992

Related U.S. Application Data

[63] Continuation-in-part of Ser. No. 687,743, Apr. 19, 1991, abandoned.

[51] Int. Cl.⁶ .................................................. H01H 43/04
[52] U.S. Cl. ........................ 364/141; 364/141; 364/143; 307/141
[58] Field of Search .................................... 364/141, 142, 364/143, 144, 145; 307/141, 141.4, 592, 595, 597, 598; 361/195, 196, 197, 198

[56] References Cited

U.S. PATENT DOCUMENTS

| | | | |
|---|---|---|---|
| Re. 31,848 | 3/1985 | Nilssen | 315/360 |
| 4,095,139 | 6/1978 | Symonds et al. | |
| 4,274,045 | 6/1981 | Goldstein | 323/319 |
| 4,300,090 | 11/1981 | Weber | 323/311 |
| 4,349,748 | 9/1982 | Goldstein et al. | 307/132 |
| 4,354,120 | 10/1982 | Schornack | 307/32 E |
| 4,521,843 | 6/1985 | Pezzolo et al. | |
| 4,570,216 | 2/1986 | Chan | 364/143 |
| 4,593,234 | 6/1986 | Yang | |
| 4,608,628 | 8/1986 | Saito et al. | 364/141 |
| 4,668,878 | 5/1987 | Wyss | 307/141 |
| 4,672,232 | 6/1987 | Schoen | 364/141 X |
| 5,258,656 | 11/1993 | Pawlick | 307/141 |

*Primary Examiner*—Paul P. Gordon
*Assistant Examiner*—Brian C. Oakes

[57] ABSTRACT

A programmable switching unit which may be incorporated in a switch for installation in a standard switch box, or into a single or multi-adaptor for connecting one or more appliances to a wall outlet, the unit being switchable between a first, learning mode, in which it updates a table of transitions between ON and OFF states of a controlled appliance over a first period, and a second, automatic mode in which it replicates the memorized transitions over a subsequent period or periods. The first period is preferably longer than the subsequent period or periods.

10 Claims, 4 Drawing Sheets

PROGRAMMABLE SWITCHING UNIT

REFERENCE TO RELATED APPLICATION

This application is a continuation-in-part of application Ser. No. 687,743 filed Apr. 19, 1991, abandoned.

BACKGROUND OF THE INVENTION

1. Field of the Invention

This invention relates to an electrical switch for controlling lights or other appliances, of the type which can exercise control in a preprogrammed manner to turn controlled equipment on and off automatically in a manner simulating normal manual usage of a switch controlling the device.

2. Review of the Art

Switches with such a capability are widely utilized, both for security purposes in order to turn lights on and off in a manner such as to provide an appearance that premises in which the switch is installed are occupied, or to turn lights or appliances on for preprogrammed periods each day.

Typically such switches incorporate a programmable timer of either electromechanical or electronic construction, and means for a user to set up manually a desired switching program. With the development of electronic technology, it has become economically viable to provide quite sophisticated programming capabilities in such devices, but in common with most programmable domestic appliances, programming requires a degree of mental application and assistance from instructions which results in the average user not fully exploiting the programming capabilities of the equipment, and rarely reprogramming it once an acceptable program has been achieved, either because of the effort involved, or because the programming instructions are no longer to hand.

Such switches may either take the form of a programmable switching device connected between an outlet and a light or appliance to be controlled, or may replace a conventional switch.

Examples of known programmable light switch controllers may be found in U.S. Pat. Nos. 4,521,843 (Pezzolo), 4,570,216 (Chan) and 4,354,120 (Schornack). The Chan and Schornack patents disclose the concept of a programming mode in which operations of the switch in a 24 hour period following initialization of the switch are memorized and repeated indefinitely. The program can apparently only be altered by resetting the device, or by powering down, i.e. disconnecting and then reconnecting the switch from the circuit in which it is used, followed by complete reprogramming. In practice, this means, that the device cannot be reprogrammed in this mode without first destroying the existing program and then waiting for twenty-four hours.

SUMMARY OF THE INVENTION

A primary object of the present invention is to provide a switch which can be readily programmed and reprogrammed to provide many of the functions of prior art switches without requiring any mental effort or reference to instructions by a user, which can be implemented with no external control devices apart from the switch activator itself, and which can have the general appearance of a conventional switch or outlet adaptor without needing any dials or displays.

Accordingly the invention provides a programmable switching unit for controlling electrically powered devices, comprising:

a microcontroller;

means associated with the microcontroller for sensing on and off conditions of a controlled device;

manually operated control switch means;

means associated with the microcontroller for sensing alternative conditions of the control switch means; and electrical switching means in series with the controlled device and controlled by the microcontroller;

the microcontroller operating in accordance with a first control program routine when it senses a first condition set by said control switch means, and a second control program routine when it senses other conditions set by said control switch means, said second control program routine causing the microcontroller to continuously update an accumulation of memorized time of on and off transitions of said controlled device, and said first control program routine causing the microcontroller to control said electrical switching means at times derived from said accumulated memorized times of on and off transitions of said controlled device.

The switching unit may include a momentary contact switch, momentary closures of which are sensed to toggle the condition of the controlled device and control said first program routine, and a prolonged closure of which is sensed to cause the microcontroller to enter the second routine, or the switch may be built into a single or multi-adaptor adaptor and use a current sensing transformer to sense the condition of the device, with a separate switch to initiate the second routine.

SHORT DESCRIPTION OF THE DRAWINGS

DESCRIPTION OF THE PREFERRED EMBODIMENT

Figure 1:
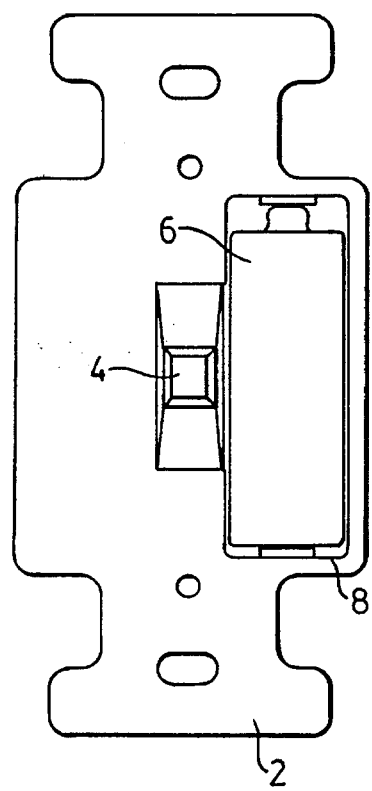
FIG. 1 is a front view of a first embodiment of a programmable switch.
Figure 2:
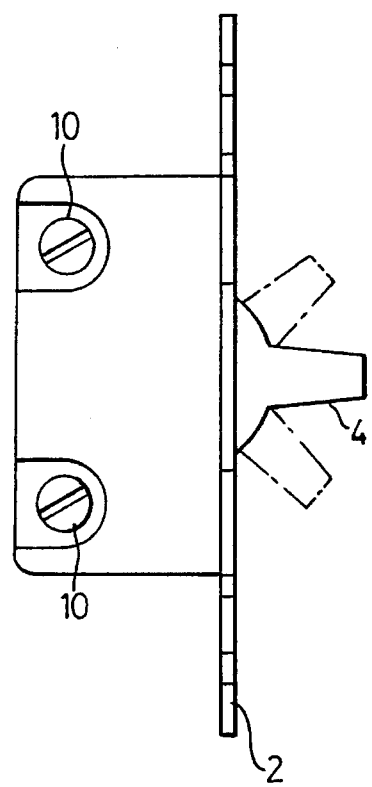
FIG. 2 is a side elevation of the switch.

Referring to FIGS. 1 and 2, the switch of the invention may be constructed so as to be an exact physical replacement of a conventional light switch, even to the extent of accepting conventional switch cover plates. Thus the switch comprises a support plate 2 by means of which the switch is mounted in the usual manner in a conventional wall box, a switch tumbler 4, a housing secured to the rear of the switch plate and accommodating the switch mechanism as well, in this case, as the electronic circuit to be described and a compartment holding a battery 6, the battery being accessible for replacement through an aperture 8 in the support plate 2 after removal of a conventional decorative cover plate (not shown). The body has conventional terminals 10 for connection to the circuit in which the switch is placed, typically but not necessarily a lighting circuit. The switch differs from conventional switches in that as well as conventional "ON" (tumbler up) and "OFF" (tumbler down) positions, both shown in broken lines, it also has a stable intermediate or "AUTO" position.

Figure 3:
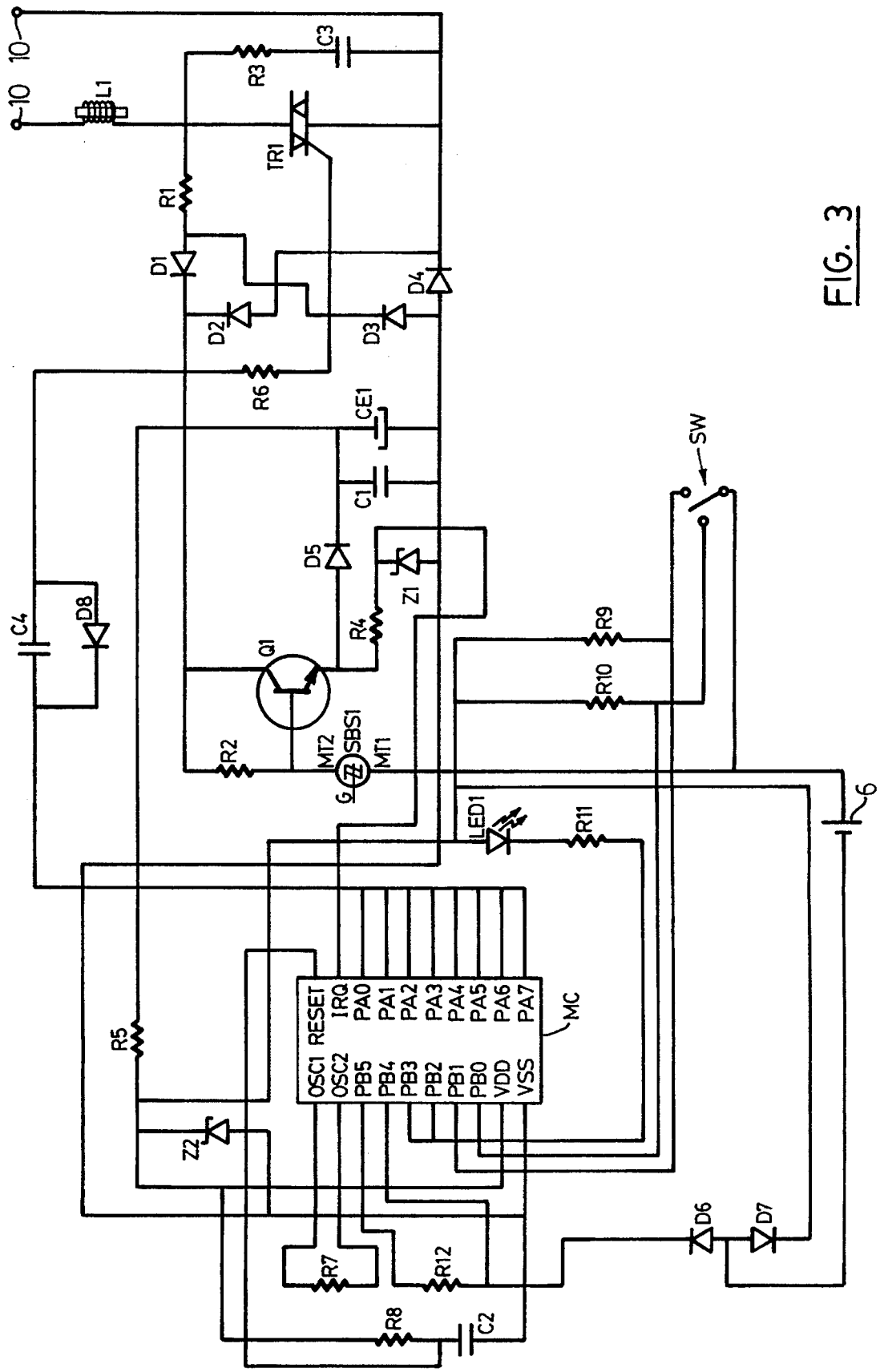
FIG. 3 is a schematic diagram of an internal circuit contained in the switch.

As best seen in FIG. 3, the switch mechanism denoted in this figure as SW, provides a single pole double-throw switch in which a grounded common conductor is connected to a resistor R9 when the switch is in the "ON" position, and to a resistor R10 when the switch is in the "OFF" position. When the switch is in the "AUTO" position, no connection is established. The switch SW does not directly control the circuit in which the switch assembly of the invention is placed, but instead provides data to the circuit shown in FIG. 2.

The exemplary circuit shown is built around a Motorola (Trademark) MC68HC05J1 mask-programmed microcontroller MC. This is a low-power HCMOS device containing 1024 bytes of user ROM, 64 bytes of RAM, two I/O ports, (Port A having eight bits PA∅ to PA7, and Port B having six bits PB∅ to PB5), a timer section, two levels of interrupts, and an internal watchdog function. Further information concerning this microcontroller will be found in the data book MC68HC05J1 Terminal Data published in 1989 by Motorola. It will of course be understood that other microcontrollers having comparable features could be utilized with appropriate amendments to the circuit.

For purposes of description,, the circuit can be broken into eight sections: namely, power supply, line-frequency interrupt pulse shaping, reset, battery, automatic indicator, clock, switch, and output sections.

AC voltage is coupled to the power supply section through coil L1 and resistor R1. Diodes D1–D4 form a full-wave bridge rectifier, the output of which is coupled through transistor Q1 and a diode D5 to an electrolytic capacitor CE1. The base of this transistor is controlled by a silicon bilateral switch SBS1, which is coupled to the rectifier output through a resistor R2.

As soon as the voltage appearing across the silicon bilateral switch, and thus across the base-emitter junction of the transistor Q1, exceeds approximately 0.65 volts, the transistor Q1 turns on and charges capacitor C1 to the voltage at the base of the transistor Q1 minus the forward voltage of the base-emitter junction of the transistor. When the voltage across the silicon bilateral switch exceeds approximately 8 volts the device rapidly goes into conduction, causing the voltage at the base of the transistor Q1 to drop almost to zero. This turns off the transistor Q1, and the capacitor CE1 does not charge any further for the duration of the half-cycle. Capacitor C1 is a ceramic capacitor bypassing high frequency noise to circuit ground.

This raw supply voltage is regulated by a resistor R5 and Zener diode Z2 to approximately 5.1 volts, to provide a supply VDD for the microcontroller.

The voltage at the emitter of the transistor Q1 is coupled through resistor R4 to Zener diode Z1 to provide pulse shaping of double line frequency interrupts applied to an interrupt Din IRQ on the microcontroller MC, thus providing a 120 Hz interrupt to the microcontroller. The microcontroller is initialized so that this pin is edge sensitive.

Resistor R8 and capacitor C2 provide a reset pulse to a RESET pin of microcontroller MC, on the initial application of power to the circuit, to ensure that the microcontroller is initialized properly.

Steering diodes D6 and D7 and resistor R12 are used to switch and test the battery power supply to the circuit. When the power supply is operating normally, the diode D7 is reverse biased since the power supply voltage is approximately 5 volts, while the battery voltage is approximately 4 volts. Should the power supply to terminals 10 fail, the diode becomes forward-biased, and supplies the microcontroller terminal VDD.

Diode D6 and resistor R12 form a battery-test section of the circuit and work as follows. Microcontroller PORT B bit PB4 is configured as an input pin, and PORT B bit PB5 is configured as an output pin. When a battery-test function is selected, the microcontroller sets the logical state of PORT B bit PB5 (which is normally "1", i.e. 5 volts) to "0", i.e. ground, which causes current to flow from the battery positive terminal through diode D6 and resistor R12 to PORT B bit PB5. The current through resistor R12 is several times that required to run the microcontroller. If the charge in the battery is low, the loading upon it will cause the voltage at the positive terminal to be less than the 3.5 volts required for PORT B bit PB4 to read a "1". If PORT B, bit PB4 does not read a "1", then the Light Emitting Diode LED 1 is turned on as described in the next section, but intermittently so as to provide a flashing warning.

The visible light emitting diode LED1 and resistor R11 are used to indicate that the switch is in the "automatic" mode. When PORT B bits 2 and 3 are set to "0", current flows from VDD through these two components, turning on the visible LED, which may be located within the switch tumbler.

Resistor R7 is selected and connected between OSC1 and OSC2 terminals of microcontroller MC to cause the microcontroller clock to run at approximately 2 megahertz.

The single-pole, double-throw switch SW is read by the microcontroller to control operation of the device. The switch couples either R9 or R10, and therefore PORT B bit PB1 or bit PB0 to circuit ground to indicate respectively, "ON" or "OFF" conditions of the switch. If neither bit is pulled to "0", operation is automatic.

All bits in PORT A are configured as output pins, and are connected in parallel and normally held at "0". When so controlled by the programming of the microcontroller, all outputs go high and provide a short-duration "on" pulse to deliver approximately 100 mA to the gate of a Triac TR1. This large gate current is necessary to ensure clean triggering of the Triac, which is associated with a filter comprising between resistor R3 and capacitor C3 in parallel, and coil L1 in series with it which provide a filter to prevent the propagation of radio-frequency interference. In addition, resistor R3 and capacitor C3 act as a snubbing network to prevent unwanted triggering of Triac TR1 by line noise exceeding its dv/dt threshold.

Figure 4:
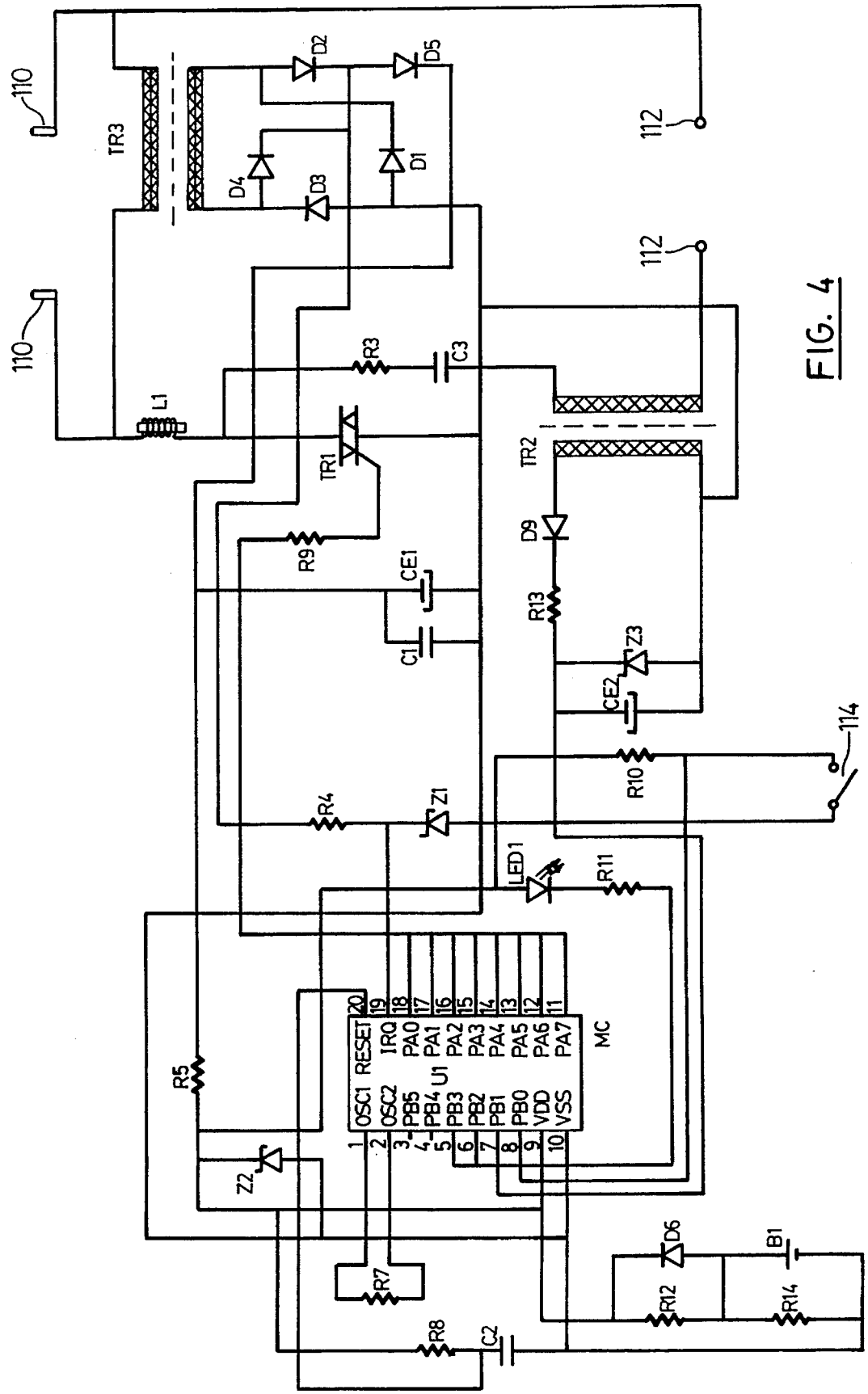
FIG. 4 is a schematic diagram of a second preferred embodiment suitable for incorporation into a conventional multiadaptor unit.

FIG. 4 illustrates the circuit of an alternative embodiment for incorporation in a conventional single or multi-adaptor through which one or more appliances can be connected to an outlet. This resembles the previous embodiment in many respects, and only the differences will be described.

Externally, the unit will incorporate line and neutral pins 110 for insertion into an outlet, and line and neutral pin receptacles 112, duplicated as necessary, for the reception of the pins of appliance plugs. A ground pin and connected ground receptacle (not shown) may be provided but do not form part of the invention. The only external difference from a conventional adaptor is the provision of a single pole on/off switch 114, which in the ON position corresponds in function to the "AUTO" position of the switch in the previous embodiment.

This embodiment does not provide a facility for manual switching of a controlled light or appliance. Instead it senses, when the switch 114 is off, whether or not a controlled appliance is turned on by sensing the passage of current to the receptacles 112 by means of a current sensing transformer TR2, similar to those used for example in ground fault interrupter devices. The primary of the transformer is in series with the line receptacle(s) 112, whilst its secondary is connected via a diode D9 and a current limiting resistor B13 to a reservoir capacitor CE2. When current through the primary reaches a threshold level, the potential across capacitor CE2 will rise high enough to raise pin PB1 of the microcontroller to logical "1" level. Development of excessive potential across capacitor CD2 is prevented by Zener diode Z3.

The bridge rectifier formed by diodes D1 to D4 is supplied from a transformer TR3 across the line and neutral pins 110, instead of through resistor R1 as in FIG. 3, thus reducing heat dissipation problems and permitting use of a simplified power supply circuit in which the series transistor Q1 and its associated base circuit components are eliminated. The battery check circuit of the previous embodiment is omitted, since a rechargeable battery B1 is used. During normal operation, the battery trickle charges through R12, whilst under power failure or unplugged conditions, the battery powers the microcontroller MC through diode D6.

Essentially the same software routines, mask programmed into the microcontroller, may be utilized for both embodiments, since the data obtained from the switch SW in its "ON" and "OFF" positions, and that derived from the current sensing transformer are essentially equivalent.

The software consists of three parts: A main program, a timer interrupt section, and a line frequency interrupt section. Each part will now be described.

The main program merely serves to disable interrupts, initialize the I/O ports, and timer, and initialize variables in several RAM locations in the microcontroller upon the first application of power, and then to enable interrupts and put the microcontroller into a "WAIT" mode, unless one of the two interrupts or a RESET occurs. The variables include LOAD ON indicating whether a circuit is to be completed between terminals 10, RANDOM indicating the magnitude of a COUNTDOWN variable. A built-in watchdog timer in the microcontroller is also enabled, which requires to be reset at predetermined intervals to verify correct functioning of the software, failing which a RESET occurs.

The timer interrupt routine is executed 65.536 milliseconds under control of a built-in timer in the microcontroller. It increments a real time clock register maintained by the controller, and then tests a flag CNTDN. If the flag is set, it decrements a register COUNTDOWN and tests whether the register content is zero. If the register content is zero, it resets the flag CNTDN and changes the condition of a flag LOADON. The watchdog timer is then reset, and the status of the unit is then read; in the embodiment of FIGS. 1–3 the switch SW is read by determining the status of bits PB0 and PB1 of Port B of the microcontroller, whilst in the embodiment of FIG. 4, the status of the same bits indicates the condition of switch 14 and whether current is passing in the circuit, i.e. whether a lamp or appliance being controlled is turned on. According to whether the condition of these bits indicates that the circuit is on, the circuit is in "AUTO" mode, or the circuit is off, one of three branches is selected. In each branch, the status of a flag, respectively WASON, WASAUTO or WASOFF is tested, and if the flag is set ON, AUTO or OFF routines respectively are executed. Otherwise, the routine returns after setting the respective flag so that the status oil the switch can be verified at the next interrupt.

The line interrupt service routine is executed each time a twice line frequency pulse is received at the pin IRQ of the microcontroller MC. The routine tests the flag LOADON, and if it is set, it applies a turnon pulse, via the lines of Port A, to the control electrode of the triac TR1 so that for the balance of the half cycle the terminals 10 (FIG. 3) or the line terminals 110 and 112 (FIG. 4) are connected, thus maintaining the controlled lamp or appliance in an ON condition. Thus the condition of the flag LOADON determines whether or not the appliance is turned on or off. The routine then increments a counter RANDOM, test whether a particular count (in this example 206) has been attained, in which case the counter is reset, and returns from the interrupt. In the FIG. 4 embodiment, the routine will also check whether the circuit is in AUTO mode, and if it is not, the turnon pulse will be transmitted to the triac TR1 so as to permit manual switching of the device.

The ON routine first checks (in the FIG. 3 embodiment only) whether a battery test flag is set, and if it performs a battery test routine using the hardware features already described. It then tests the LOADON flag. If the flag is not set, it is set, the time is read from the real time clock register REALTIME, a table of stored ON times is scanned for a match, and if no match is found, the new ON time, represented by the time read from REALTIME, is stored in the table. If the LOADON flag is already set, the time read from REALTIME is checked against the table of stored ON times and a table of stored OFF times, and if a match is found, the table entry concerned is cancelled. The resolution of the real time clock can be quite coarse, providing for example time slots of about 6 minutes (240 time slots per day).

The OFF routine is similar to the ON routine, except that the LOADON flag is tested for a reset condition, and the left hand branch accesses the OFF times table rather than the ON times table.

The AUTO routine first tests the CNTDN flag, and returns if it is reset. If set, it then tests the LOADON flag. If the LOADON flag is not set, it fetches the real time from REALTIME, increments it and tests the OFF times table for a match, returning in the absence of a match or branching to a countdown routine if there is a match. If the LOADON flag is set, similar steps are taken with the ON times table. The countdown routine test the CNTDN flag and exits if it is set. Otherwise it places content of the RANDOM register in the COUNTDOWN register, sets CNTDN and exits.

The effect of the ON and OFF routines, which are only operative when the unit is not in the AUTO condition, is to store tables of ON and OFF times accumulated over the immediately preceding twenty four hour period (obviously this period can be varied to suit any particular application), reflecting either the condition of the switch SW (FIG. 3), or whether current is passing to a controlled lamp or appliance (FIG. 4). When the unit is in the AUTO condition, the triac will be controlled as to maintain a controlled lamp or appliance either on or off in accordance with the table entries. In order to introduce a random element into the control cycle, the register COUNTDOWN is loaded with a semi-random number taken from the register RANDOM, which register is counted down as a time slot is reached that is one in advance of a timeslot entered in one of the ON and OFF time tables, so that the actual turn-on and turn-off times are somewhat random.

In use, the device may be utilized as a normal switch or adaptor, under which circumstances it memorizes a history of ON and OFF events over a period limited by the length of the real time clock cycle, or placed in an AUTO mode, in which it replicates the memorized history of ON and OFF events occurring during the period preceding its being placed in AUTO mode, with a limited degree of semi-random variation of on and off times. No special programming procedure is required, nor is any time setting provision required. If the device has a 24 hour cycle, then events during the 24 hours preceding entering the AUTO mode will be replicated. If the cycle time is a week, then events over a week will be replicated.

The embodiments of the invention so far described, whilst representing a substantial advance of the manual programming of most prior art devices, and the 'inherent' but inflexible programming of the device described in the Chan patent referred to above, nevertheless depend on the twenty-four hour (or other) period immediately preceding entry of the automatic mode of the switch being representative of normal usage. Furthermore, the three position switch utilized in the first embodiment is a nonstandard and thus expensive device.

I nave found that, by combining accumulated data relating to times of ON and OFF transitions of the controlled device from a plurality of preceding periods (usually 24 hour periods), the likelihood of providing a schedule for automated operation which is representative of normal usage is greatly improved. Thus for example by maintaining tables of ON and OFF transitions for each of three twenty-four periods which are updated sequentially during normal operation of the switch, and combining the contents of these tables on a logical OR basis during automatic operation of the switch, representative usage during any one of the three days prior to entering automatic operation is likely to provide a satisfactory simulation of normal usage, particularly when the timings of the ON and OFF transitions are adjusted by small random amounts as previously discussed. Other modes of data accumulation are possible. For example a fixed number, for example eight, of both the most recent ON events and the most recent OFF events could be stored, in order to provide a schedule of events for use in the automatic mode over a twenty-four hour period.

Figure 5:
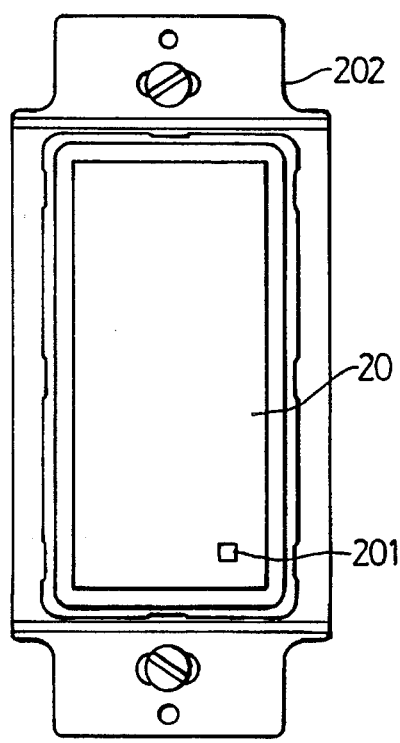
FIG. 5 is a front view of a third and presently preferred embodiment of a programmable switch.
Figure 6:
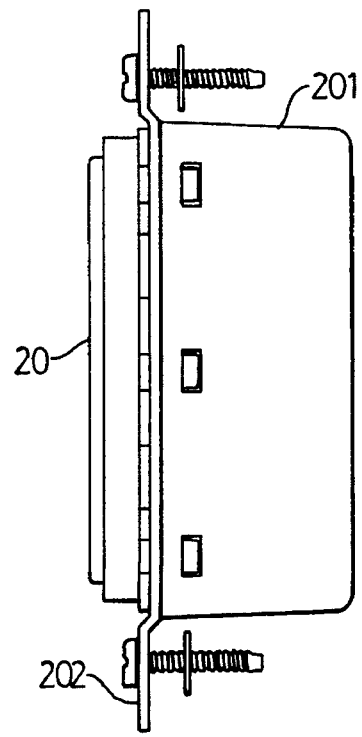
FIG. 6 is a side elevation of the switch of FIG. 5.
Figure 7:
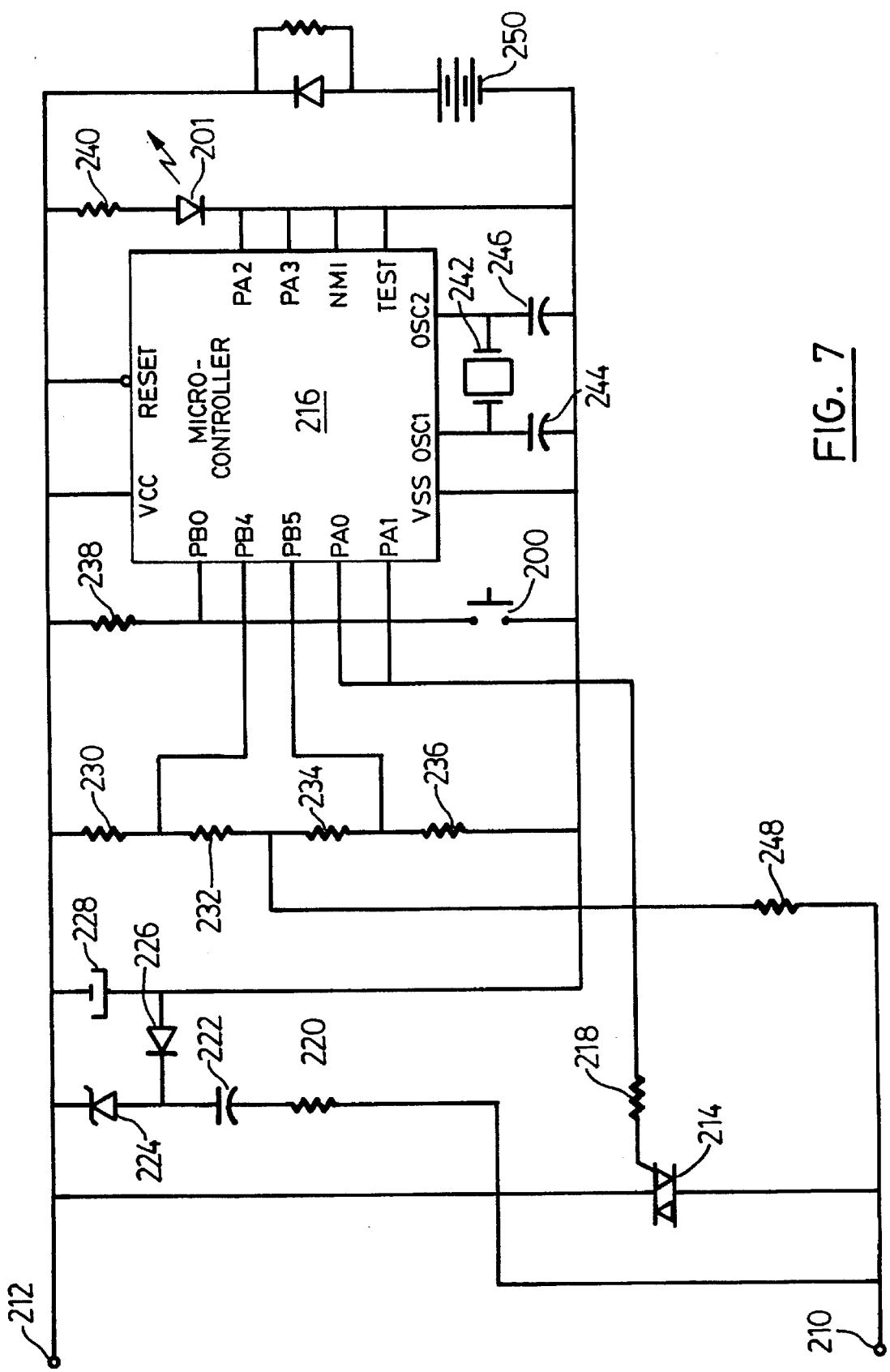
FIG. 7 is a schematic diagram of the switch of FIG. 5.

Referring to FIGS. 5–7, the electronic circuit of FIG. 7 is contained within a housing 201 of a momentary contact switch 200 having a mounting plate 202 and a push plate 20, which acts to close the switch when pressed. An light emitting diode (LED) 201 is mounted in the push plate.

The circuit itself is based upon the ST6210 microcontroller from SGS-Thompson which is specifically designed for use in power control applications. This microcontroller incorporates clamping diodes designed to provide a high degree of transient protection, enabling their direct connection to the supply through suitable resistor chains. The circuit is connected between line and load terminals 210 and 212 and includes a triac 214 connected directly between these terminals. When suitable signals are applied to the triac 214 from parallel connected output ports, lines PA0 and PA1 of the microcontroller 216 through a current limiting resistor 218, the triac is turned on shortly after the beginning of each half cycle of the supply; otherwise it remains turned off. The power supply circuit for the microcontroller is also connected across the terminals 210, and includes a dropper resistor 220, a capacitor 222 and a zener diode 224 in series so as to produce voltage limited negative going pulse across the diode 224 during or at least at the beginning of each negative half-cycle of the supply, a rectifier diode 226 and a reservoir capacitor or equivalent 228. One terminal 210 is also connected through a resistor 248 to a mid point of a chain of resistors 230, 232, 234 and 236 connected at each end to the positive and negative supply terminals VCC and VSS of the microcontroller 216, forming two potentiometers connected respectively to input port lines PB4 and PB5 of the microcontroller. A further input port line PB0 is normally pulled up by a resistor 238, but may be pulled down by the momentary contact switch 200. An output port line PA2 can sink current through a resistor 240 and the LED 201. Reset, non-maskable interrupt (NM1) and test terminals of the microcontroller are not used and are grounded. A crystal 242 in conjunction with capacitors 244 and 246 connected to terminals OSC1 and OSC2 provide a clock signal for the microcontroller. In place of or additional to the reservoir capacitor 228, a rechargeable battery 250 may provide back-up power to the microcontroller 216 in the event of a power failure.

Operation of the microcontroller will be readily apparent from study of the following pseudocode listing and memory map.

As compared with the preceding embodiments, both normal switching functions and mode switching are performed using a single momentary contact switch. As will be apparent from study of the preceding pseudocode, a brief press on the switch 200 (in this example less than two seconds) will merely cause the device as a whole to toggle between an ON condition in which the microcontroller forwards triggering pulses to the triac 214, thus allowing current to pass between the terminals 210 (except for brief periods at the start of each half cycle utilized to provide power to the microcontroller through the power supply circuit already described), and an OFF condition in which no pulses are forwarded and an open circuit times exists between the terminals 210 (except for a minimal current flow used to power the microcontroller). Any such activation of the switch will reverse the condition of the device, and will also take it out of the 'automatic' mode. In order to place the device in automatic mode, the switch is pressed for at least two seconds, and thereafter, until the switch is again pressed to toggle the state of the device, the microcontroller will change the condition of the device according to the data stored as to switch transitions in the tables for three successive twenty-four hour periods, the data in the tables relating to transitions of the type necessary to reverse the state of the switch being logically ORed to provide a composite switching pattern, and the timing of any transition applied being subjected to a random variance of up to 15 minutes (in this example). In normal mode, the tables are written to on successive days, one at a time.

Various modifications in the program are possible within the scope of the invention. For example, a single table each of 'ON' and 'OFF' transitions could be maintained, with additions of transitions of each type beyond a predetermined total, for example eight, resulting in the oldest stored transition being discarded. Either system results in the stored pattern of switch transitions being updated on a continuous basis when the switch is in normal use, and in a composite pattern being regenerated during a cycle automatic operation which is based upon a composite of several cycles (usually 24 hour periods) of normal operation. This is a major improvement over systems in which the automatic operation period is set up during an initialization of the switch, whether the programming of the actual switch transition times is manual or 'inherent'.

I claim:

1. A programmable switching unit for controlling electrically power devices, comprising;

a microcontroller and memory associated therewith;

means associated with the microcontroller for sensing ON and OFF transitions of a controlled device;

user operated control switch means;

means associated with the microcontroller for sensing alternative conditions of the control switch means;

electrical switching means in series with the controlled device and controlled by the microcontroller;

a timer implemented by the microcontroller and having a cycle period of predetermined duration; and the microcontroller including a control program having a first control program routine executed when the microcontroller senses a first condition set by said control switch means, and a second control program routine executed when it senses other conditions set by said control switch means, said second control program routine causing the microcontroller to continuously update at least one table, formed in said memory, of time slots within a cycle period, within which ON and OFF transitions of said controlled device occur over a plurality of cycle periods, and said first control program routine causing the microcontroller to review said at least one table in advance of each time slot within a period for events which occurred within that time slot in any of said plurality of cycle periods, determining according to the events detected and according to logic determined by said first control program routine whether a transition should occur during that time slot, and controlling said controlled switching device during that time slot to apply at a time during the time slot and transition which the routine has determined should occur.

2. A switching unit according to claim 1, including a three position switch having two positions for establishing ON and OFF conditions of the controlled device in first and second positions, and said first condition being established by a third position of the control switch means, the position of said switch being sensed to sense ON and OFF conditions of the controlled device.

3. A switching unit according to claim 1, wherein the means for sensing ON and OFF conditions of a controlled device is a current sensing transformer in series with the controlled device.

4. A switching unit according to claim 2, configured for mounting in a standard electrical wall switch box.

5. A switching unit according to claim 3, housed in an adaptor having pins for insertion in a wall outlet and receptacles for receiving a plug of a controlled device.

6. A switching unit according to claim 1 wherein said first program routine includes a subroutine to introduce substantially random variation in each individual time generated by the microcontroller.

7. A switching unit according to claim 1, wherein the manually operated switch means is a momentary contact switch, and the microcontroller senses closures of that switch, a prolonged closure initiating said first control program routine and a short closure initiating said second program routine and toggling the condition of said electrical switching means.

8. A switching unit according to claim 1, wherein the second program routine configures the microcontroller to maintain multiple tables relating to a plurality of sequential predetermined periods, and the first program routine logically ORs the contents of said multiple tables, to derive the times at which it controls said electrical switching means.

9. A switching unit according to claim 1, wherein said first control program routine is configured first to review said at least one table for events representing transitions of said controlled device from its condition in a previous time slot, and if such a first transition is detected, to further review the table for an opposition transition, and if such an opposite transition is detected, the first control program routine is configured to control said controlled switching device during the time slot to apply at different successive times during the time slot both the first transition and the opposite transition.

10. A programmable switching unit for controlling electrically powered devices, comprising:

a microcontroller;

means associated with the microcontroller for sensing ON and OFF transitions of a controlled device;

user operated control switch means;

means associated with the microcontroller for sensing alternative conditions of the control switch means;

electrical switching means in series with the controlled device and controlled by the microcontroller;

memory associated with said microcontroller and including an array formed therein for storing event data as to times of transitions of said electrical switching means between ON and OFF conditions;

a timer implemented by the microcontroller and having a cycle period of predetermined duration;

the microcontroller having a first control program routine which it executes when it senses a first condition set by said control switch means, said first control program routine causing the microcontroller to control said electrical switching means within each of multiple time slots of a cycle period according to a switching program synthesized by logically combining event data relating to that time slot and stored in said array; and the microcontroller having a second control program routine which senses and stores in said array event data relating to times of ON and OFF transitions of the controlled device within a cycle period, the array having the capacity to store event data from multiple cycle periods whereby said program is synthesized from data accumulated over multiple cycle periods, wherein the array is configured to store separately data from each of an integral number of cycle periods, and wherein the second routine logically ORs the separately stored data to synthesize said switching program.

\* \* \* \* \*